May 5, 1931.  A. G. HEGGEM  1,803,471
STUFFING BOX
Filed March 26, 1927   2 Sheets-Sheet 1
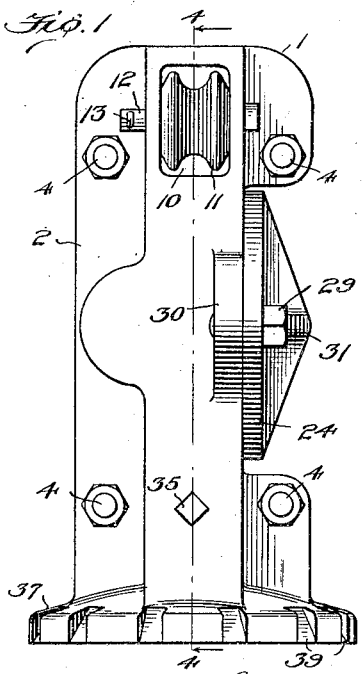
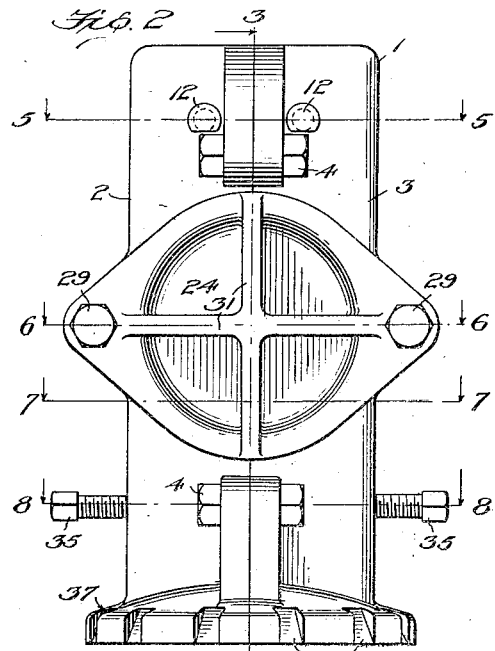
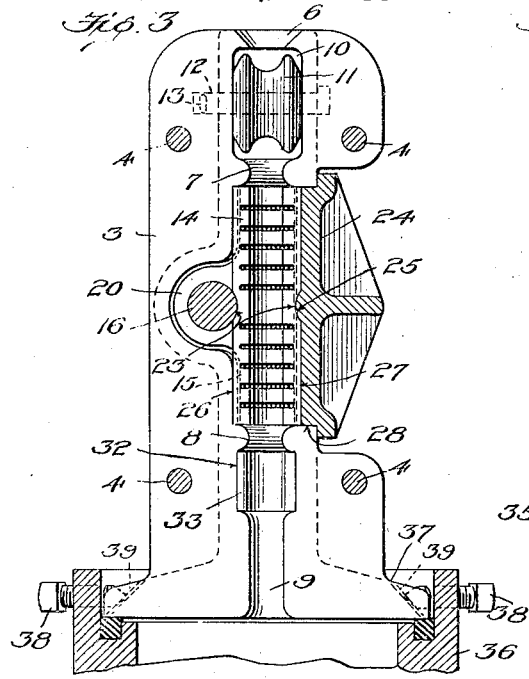
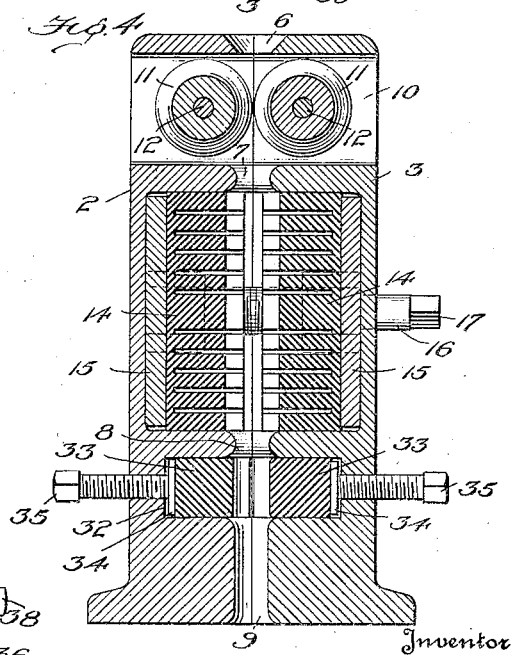
Inventor
Alfred G. Heggem May 5, 1931.  A. G. HEGGEM  1,803,471
STUFFING BOX
Filed March 26, 1927   2 Sheets-Sheet 2
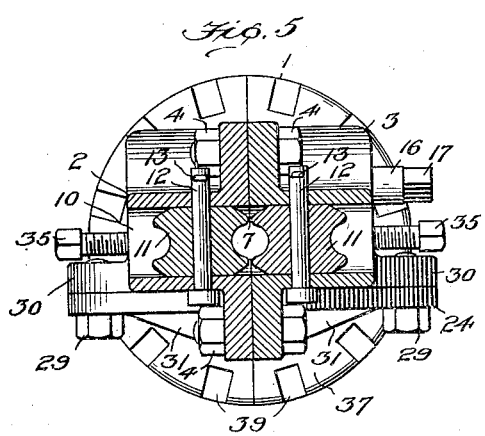
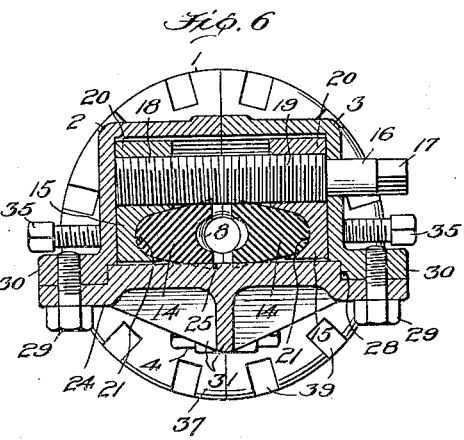
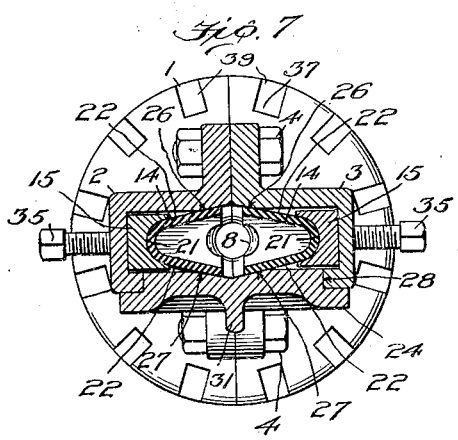
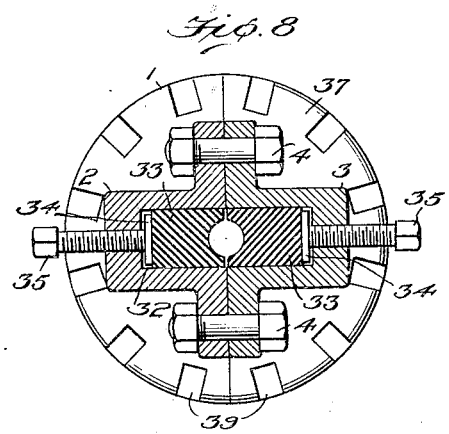
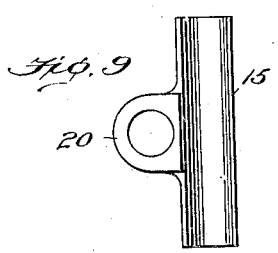
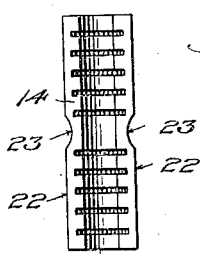
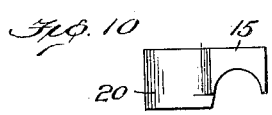
Inventor
Alfred G. Heggem
By
Attorney Patented May 5, 1931

1,803,471

UNITED STATES PATENT OFFICE

ALFRED G. HEGGEM, OF TULSA, OKLAHOMA

STUFFING BOX

Application filed March 26, 1927. Serial No. 178,607.

My invention relates to stuffing boxes primarily designed to pack a flexible reciprocating element such, for instance, as a drilling line or cable employed in the drilling of oil or other wells. The principal object of the invention is to provide simple and efficient means for adjusting the packing members by which loss of oil or other fluid is prevented during the period when the drilling line is in motion in drilling, swabbing, baling or in entering or withdrawing the tools. A further object is so to construct the stuffing box that ready access may be obtained to the packing elements; and a still further important object of the invention is to provide efficient packing elements giving a high degree of wear with the use of a comparatively small amount of packing material.

The principal feature of the invention consists, generally stated, in providing the stuffing box with alined openings for the passage of the cable or reciprocating element, and in combining therewith a plurality of flexible packing members which are adapted to be forced into contact with the reciprocating element by opposed packing followers arranged on opposite sides of the alined openings of the stuffing box, means being provided for simultaneously advancing the followers and thereby forcing the packing members toward each other.

A further feature of the invention resides in longitudinally dividing the stuffing box into two laterally separable sections having alined openings for the passage of a reciprocating element, the said stuffing box having a chamber receiving flexible packing members and being provided with a side opening normally closed by a cover plate, said opening upon removal of the plate affording access to the packing members within the stuffing box chamber.

A still further feature of the invention consists in forming the flexible packing members so that they are of truncated prismatic cross section, the sides of the members being divergent toward the moving element to be packed.

Other features of the invention pertaining to advantageous combinations of elements and desirable forms of parts will hereinafter appear and be pointed out in the claims.

In the drawings:—

Figure 1 is a side elevational view of a stuffing box embodying a preferred form of the invention.

Figure 2 is also a side elevational view at right angles to Fig. 1.

Figure 3 is a vertical sectional view on the line 3—3, Fig. 2.

Figure 4 is a vertical sectional view on the line 4—4, Fig. 1.

Figure 5 is a transverse sectional view on the line 5—5, Fig. 2.

Figure 6 is a sectional view on the line 6—6, Fig. 2.

Figure 7 is a sectional view on the line 7—7, Fig. 2.

Figure 8 is a transverse sectional view on the line 8—8, Fig. 2.

Figure 9 is a detail elevational view of one of the packing followers.

Figure 10 is a plan view of one of the packing followers.

Figure 11 is a view in elevation of one of the flexible packing members.

In the drawings 1 indicates the stuffing box which is longitudinally divided to form two laterally separable sections, 2 and 3, respectively, which are rigidly secured together by means of bolts 4. The configuration of the abutting faces of the stuffing box sections is such as to provide alined openings 6, 7, 8 and 9, respectively, for receiving the drilling line or reciprocating element to be packed. At its upper end the stuffing box provides a chamber 10 for receiving grooved guide rollers or spools 11 which are disposed on opposite sides of the reciprocating element so as to control its lateral vibration and thus relieve the packing material of excessive wear. As shown in the drawings, each of these rollers may be mounted upon one of the sections of the stuffing box by means of a headed journal pin 12 which is maintained in position by a cotter 13.

Below the guide rollers the stuffing box is formed with a packing chamber which receives flexible packing members 14, preferably of rubber, and followers 15 adapted to force the packing members into contact with the reciprocating part to be packed. The followers 15 are adapted to be advanced or retracted simultaneously by means of an adjusting screw 16 having a square outer end 17 suitable for receiving an operating wrench. The operating screw is provided with right hand threads 18 and left hand threads 19 which respectively cooperate with correspondingly threaded lugs 20 with which the followers are provided at one side. By this means the equal advancement of the rubber packing members 14 and their contact in a central position is always ensured, thus enabling all of the packing material to be uniformly utilized until it is worn out. The oppositely threaded hand screw 16 also provides means for rapidly adjusting the packing by a single operation. To minimize the bending moment of the adjusting screw 16 and the followers 15, the screw is preferably positioned close to the axis or center of the stuffing box.

The flexible packing members 14 which, as shown, may advantageously be laminated, are of truncated prismatic cross section transversely, their follower contacting ends 21 being rounded to conform to the correspondingly rounded seats 22 of the cooperating followers 15 and their sides being convergent rearwardly toward their respective followers. The upper and lower ends of the rubber packing members 14 are preferably parallel and the rounded follower engaging surface 21 is of uniform curvature from end to end of the packing. To permit the adjusting screw 16 to be positioned closer to the center of action than would otherwise be possible, each of the packing members 14 may be provided intermediate of its ends with a groove 23 for receiving the neighboring part of the adjusting screw. Two of these grooves are preferably formed in each of the packing members, as such a construction prevents the possibility of improper assembly of the packing. If desired, and as is preferred, the cover plate 24 of the stuffing box may be provided on its inside with a curved rib or bead 25 which enters the grooves 23 in the sides of the packing members opposite the adjusting screw 16. This construction assists in uniformity of adjustment and wear of the packing.

Except at the center where the adjusting screw 16 and the curved rib 25 on the cover plate are located, the walls of the packing receiving chamber of the stuffing box are beveled to conform to the sloping sides of the packing members 14, such construction being afforded by beveling the inner faces of the stuffing box sections, as indicated at 26, and similarly beveling the inner face of the cover plate 24, as shown at 27. These bevels or inclines provide for sufficient width at the faces of the packing which contact the drilling line to permit the resilient packing to compensate for wear.

The opening 28 in the side of the stuffing box through which access to both packing members 14 is obtained, by removing the single cover plate 24, is formed in part in each of the laterally separable sections 2 and 3 of the stuffing box. The cover may be conveniently secured to the body sections of the stuffing box by means of cap screws 29 having threaded engagement with lugs 30 with which the separable sections of the stuffing box are respectively provided. The cover plate may advantageously be provided on its external face with radially extending stiffening flanges 31 of tapering form.

Below the intermediate chamber containing the packing members 14 and cooperating followers 15, the stuffing box is formed with a third chamber 32 which receives packing members 33, preferably formed of rubber, which are employed to form a closure about the drilling line when it is desired to replace or renew the packing elements 14 within the intermediate chamber of the stuffing box. These auxiliary packing members 33 are preferably advanced toward the drilling line by means of followers 34 which are respectively acted upon by adjusting set screws 35 having threaded engagement with the sections of the stuffing box. As in the case of the packing members 14, the auxiliary packing elements 33 are preferably cylindrically grooved on their inner faces to correspond with the curvature of the reciprocating element to be packed.

For the purpose of enabling the device to be secured to a casing head 36 of the familiar type (see Fig. 3) and to form a top for the latter, the stuffing box is provided at its lower end with a circular flange or base 37 formed in part on each of the laterally separable sections of the stuffing box body. The screw studs 38 carried by the casing heads are adapted to enter notches 39 and engage the inclined portions of the flange forming the bases of said notches, thereby securing the stuffing box to the casing head in the usual manner. The upper surface of the flange 37 between the notches 39 is preferably less steeply inclined than the inclined surfaces forming the bottoms of the notches, thus providing for securing the stuffing box to the casing head by a clamp device rather than by set screws. The plurality of notches 39 permits the stuffing box to be attached in a variety of positions.

I claim:—

1. In a device of the character indicated, the combination with a stuffing box having alined openings for the passage of a reciprocating element to be packed, of flexible packing means comprising laterally separable sections, packing followers disposed between said stuffing box and said packing means on opposite sides of the axis of the alined openings, and a threaded rod for simultaneously actuating said followers toward the axis of the alined openings, said rod having threaded engagement with said followers.

2. In a device of the character indicated, the combination with a sectional stuffing box divided longitudinally and having alined openings for the passage of a reciprocating element to be packed, of flexible packing means, a plurality of relatively movable followers cooperating with said packing means, and an adjusting screw having threaded engagement with the followers within the stuffing box for simultaneously actuating the followers.

3. In a device of the character indicated, the combination with a stuffing box having alined openings for the passage of a reciprocating element to be packed, of packing means comprising laterally separable sections, a plurality of opposed followers for cooperating with the packing means, and an adjusting screw for actuating the followers, said screw having right hand threads and left hand threads and the individual followers having threaded engagement with the adjusting screw, one follower having right hand threads and the other left hand threads.

4. In a device of the character indicated, the combination with a stuffing box having a packing chamber and alined openings for the passage of a reciprocating element to be packed, of packing means within said chamber comprising separable flexible sections, and means for forcing said packing sections toward the axis of the alined openings, said stuffing box having a side opening communicating with the chamber and comprising a body formed of separable sections and a cover plate secured to the body for closing the opening, said packing chamber and the opening being formed in part in each of the sections of the stuffing box body.

5. In a device of the character indicated, the combination with a stuffing box having a packing chamber and alined openings for the passage of a reciprocating element to be packed, of a plurality of flexible packing members within the chamber disposed upon opposite sides of the axis of the openings, followers respectively cooperating with the packing members, and an adjusting screw for actuating the followers, said adjusting screw overlapping said packing members between their ends, and each of said packing members being provided intermediate its ends with a groove for receiving a portion of the adjusting screw.

6. In a device of the character indicated, comprising a stuffing box having a packing chamber and being provided with alined openings for the passage of a reciprocating element to be packed, a plurality of laterally separable flexible packing members within said chamber disposed upon opposite sides of the axis of said alined openings, means for advancing the packing members towards said axis and means for causing said packing members to compensate for wear, said last-named means consisting in bevelling the inner vertical faces of the walls of the packing chamber adjacent said axis and in providing the flexible packing members with sloping sides diverging towards said axis and which cooperate with said bevelled faces.

In testimony whereof I affix my signature.

ALFRED G. HEGGEM.